US011381269B1

(12) United States Patent
Alnabulsi

(10) Patent No.: US 11,381,269 B1
(45) Date of Patent: Jul. 5, 2022

(54) METHOD AND DEVICE FOR TIMING RECOVERY DECOUPLED FFE ADAPTATION IN SERDES RECEIVERS

(71) Applicant: INPHI CORPORATION, San Jose, CA (US)

(72) Inventor: Basel Alnabulsi, Ottawa (CA)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/334,281

(22) Filed: May 28, 2021

(51) Int. Cl.
*H04L 23/02* (2006.01)
*H04B 1/18* (2006.01)
*H04L 25/03* (2006.01)
*H04B 1/16* (2006.01)

(52) U.S. Cl.
CPC .............. *H04B 1/18* (2013.01); *H04B 1/1607* (2013.01); *H04L 25/03057* (2013.01); *H04L 25/03267* (2013.01); *H04L 2025/0349* (2013.01)

(58) Field of Classification Search
CPC . H04L 1/0054; H04L 1/005; H04L 25/03038; H04B 10/6971; H04B 10/693; H04B 10/07953
USPC ........... 375/262, 233, 349, 260, 267; 398/26
See application file for complete search history.

(56) References Cited

U.S. PATENT DOCUMENTS

| | | | |
|---|---|---|---|
| 9,124,454 B1 * | 9/2015 | Venkataraman | H04L 25/03019 |
| 9,215,107 B1 * | 12/2015 | De Bernardinis | H04L 7/0062 |
| 10,972,249 B1 * | 4/2021 | Graumann | H04L 7/0058 |
| 11,218,225 B1 * | 1/2022 | Alnabulsi | H04B 10/6931 |
| 2013/0343402 A1 * | 12/2013 | Dickson | H04L 49/10 370/419 |
| 2015/0195108 A1 * | 7/2015 | Prokop | H04L 25/03057 375/233 |
| 2021/0006439 A1 * | 1/2021 | Li | H04L 25/4917 |

* cited by examiner

*Primary Examiner* — Khai Tran

(57) ABSTRACT

A device and method for a receiver configured to perform timing recovery decoupled feed-forward equalizer (FFE) adaptation. The receiver device can include an analog front-end (AFE) device, which is coupled to a time-interleaved (TI) interface. The TI interface is coupled in a timing recovery feedback loop to FFE equalizers, a digital signal processor (DSP), a delay timing loop (DTL) device, and a clock device, which feeds back to the TI interface. The DSP has an additional pathway to the FFE equalizers, which has an additional pathway to the DTL device. The DTL loop is equipped with an interleave specific enable/disable vector Q[1:N] that can turn on/off the contribution of the specific time interleave errors to the timing recovery loop, which allows the FFE adaptation process to be decoupled from the timing recovery loop.

20 Claims, 3 Drawing Sheets

METHOD AND DEVICE FOR TIMING RECOVERY DECOUPLED FFE ADAPTATION IN SERDES RECEIVERS

CROSS-REFERENCES TO RELATED APPLICATIONS

The present application incorporates by reference, for all purposes, the following patent applications, all commonly owned: U.S. patent application Ser. No. 14/806,346, titled "CIRCUIT AND METHOD FOR PERFORMING ADAPTATION ON ALL RECEIVER BRANCHES", filed Jul. 22, 2015, now U.S. Pat. No. 9,467,315; and U.S. patent application Ser. No. 15/260,692, a continuation of the application above, filed Sep. 9, 2016, now U.S. Pat. No. 9,660,841.

BACKGROUND OF THE INVENTION

The present invention generally relates to communication systems and integrated circuit (IC) devices. More specifically, the present invention provides for a method and device for timing recovery decoupled feed-forward equalizer (FFE) adaptation in serializer/deserializer (SerDes) receiver device.

Over the last few decades, the use of communication networks has exploded. In the early days of the Internet, popular applications were limited to emails, bulletin boards, and mostly informational and text-based web page surfing. The amount of data transferred by such applications was relatively small. Today, the Internet and mobile applications demand a huge amount of bandwidth for transferring photo, video, music, and other multimedia files. For example, a social networking platform can process more than 500 TB of data daily. With such high demands on data storage and data transfer, existing data communication systems need to be improved to address these needs.

With the rapidly rising demand for greater operational speed and data throughput, an important aspect of signal processing to address is signal equalization at the receiver, which is the process of removing distortions incurred by a signal being transmitted through a channel. Such signal integrity impairments can be addressed using signal equalization techniques such as feed-forward equalization (FFE), decision-feedback equalization (DFE), continuous-time linear equalization (CTLE), and the like and combinations thereof.

There have been many conventional types of methods and devices for signal equalization. Unfortunately, such conventional methods and devices suffer from various drawbacks and limitations, including those related to performance, size, cost, etc. Therefore, improved communication systems with devices and methods using more efficient signal equalization are highly desired.

BRIEF SUMMARY OF THE INVENTION

The present invention generally relates to communication systems and integrated circuit (IC) devices. More specifically, the present invention provides for a method and device for timing recovery decoupled feed-forward equalizer (FFE) adaptation in a serializer/deserializer (SerDes) receiver device. Merely by way of example, the present invention is applied to communication systems using pulse-amplitude modulation (PAM). However, the present invention has a much broader range of applicability, such as other Ethernet systems, optical systems, and the like.

According to an example, the present invention provides a communication system and a receiver device configured to perform FFE adaptation process decoupled from a timing recovery loop of the device. The receiver device can include an analog front-end (AFE) device, which is coupled to a time-interleaved (TI) interface. The TI interface is coupled in a timing recovery feedback loop to FFE equalizers, a digital signal processor (DSP), a delay timing loop (DTL) device, and a clock device. The clock device feeds back to the TI interface to complete the timing recovery loop. The DSP has an additional pathway to the FFE equalizers, which has an additional pathway to the DTL device. In a specific example, the DTL loop is equipped with an interleave specific enable/disable vector Q[1:N], which can turn on/off the contribution of the specific time interleave errors to the timing recovery loop. Using this interleave vector, the present receiver device can decouple the FFE adaptation process from the timing recovery loop.

According to an example, the present invention provides a method of operating a communication system and a receiver device configured to perform a timing recovery decoupled FFE adaptation process. The method can include receiving and processing an input signal by the AFE device. Then, the TI interface samples the input signal according to a plurality of indexes associated with its plurality of lanes. In preparation for an iterative adaptation process, the method can include determining one or more phase conditions for the plurality of FFEs coupled to the TI interface in the timing recovery loop configuration. The iterative adaptation process can include performing an iterative FFE adaptation process on the input signal via each of the TI interface lanes and using the interleave specific vector to disable a contribution of the target lane to the timing recovery loop configuration while performing the FFE adaptation process on the target lane. Those of ordinary skill in the art will recognize other variations, modifications, and alternatives.

Many benefits are recognized through various embodiments of the present invention. Such benefits include improved bit error rates and the ability to have the FFE optimize the phase in mission mode. Depending upon the embodiment, the techniques implemented in the present invention are also cost-effective and relatively simple to implement. Other such benefits will be recognized by those of ordinary skill in the art.

The present invention achieves these benefits and others in the context of known IC fabrication processes. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
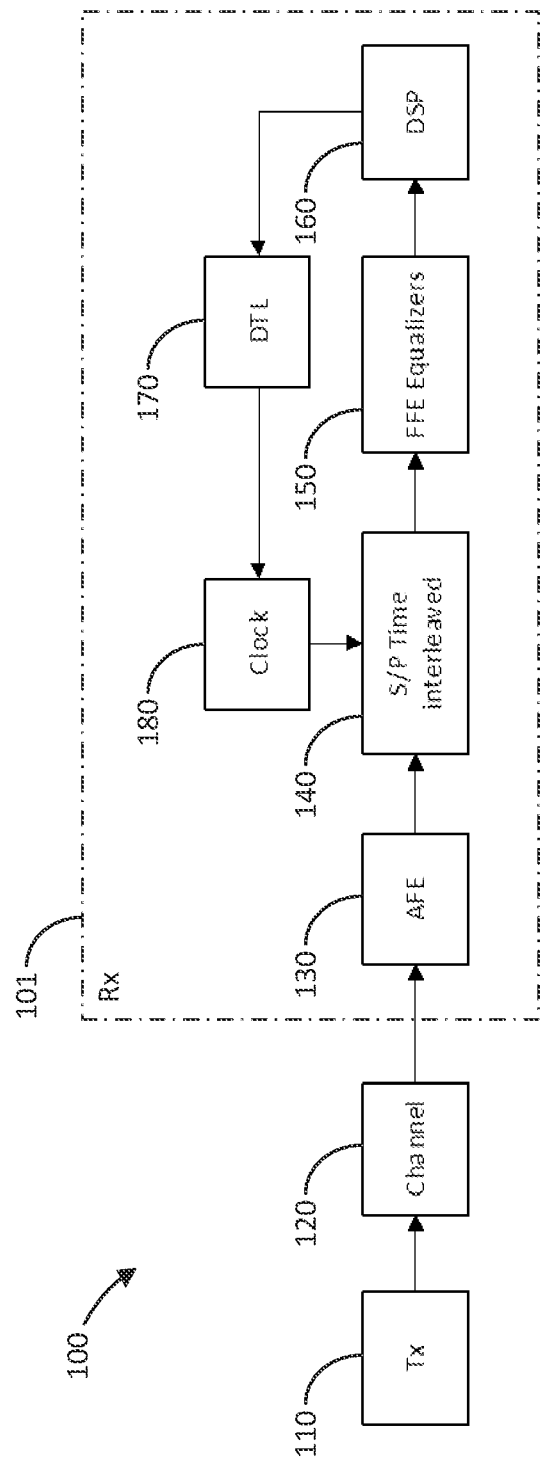
FIG. 1 is a simplified block diagram illustrating a receiver device according to a conventional example.

The present invention generally relates to communication systems and integrated circuit (IC) devices. More specifically, the present invention provides for a method and device for timing recovery decoupled feed-forward equalizer (FFE) adaptation in a serializer/deserializer (SerDes) receiver device. Merely by way of example, the present invention is applied to communication systems using pulse-amplitude modulation (PAM). However, the present invention has a much broader range of applicability, such as other Ethernet systems, optical systems, and the like.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counterclockwise have been used for convenience purposes only and are not intended to imply any particular fixed direction. Instead, they are used to reflect relative locations and/or directions between various portions of an object.

FIG. 1 is a simplified block diagram illustrating a communication system 100 according to a conventional example. System 100 includes a transmitter device 110 coupled to a receiver device 120 (marked by dotted lines) via a channel 111. As shown, the receiver device 120 first receives a signal from the transmitter device 110 over the channel 111 at an analog front-end (AFE) device 130, which is coupled to a serial-to-parallel (S/P) time-interleaved (TI) interface 140. The TI interface 140 is coupled in a timing recovery feedback loop to FFE equalizers 150, a digital signal processor (DSP) 160, a delay timing loop (DTL) device 170, and a clock device 180. The clock device 180 feeds back to the TI interface 140 to complete the timing recovery loop.

In this example, the FFE adaptation process interacts with the timing recovery loop (i.e., DTL loop). If the DTL loop moves the phase in a given direction, then without constraints on the FFE coefficients, the FFE will adapt to the new phase, leading the system to move to the edge of the eye and fail. The examples of the present invention below provide for a method and device for adapting an FFE of a time-interleaved SerDes receiver in mission mode while eliminating interaction with the timing recovery loop.

Figure 2:
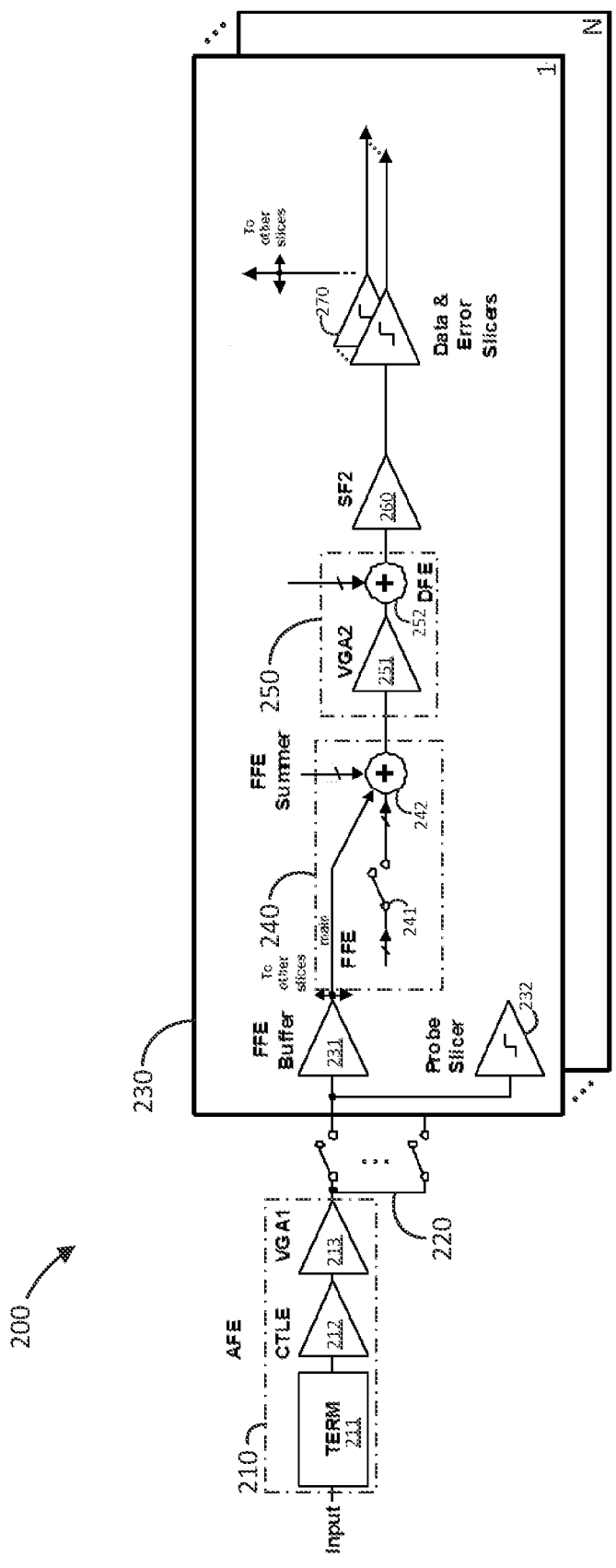
FIG. 2 is a simplified circuit block diagram illustrating a receiver device according to an example of the present invention.

FIG. 2 is a simplified circuit block diagram illustrating a receiver device 200 according to an example of the present invention. Device 200 can be an example circuit configuration of the receiver device 101 shown in FIG. 1. As shown, device 200 includes an AFE 210 coupled to an interleaving interface 220, which is coupled to a time-interleaved (TI) array 230. The TI array 230 includes a plurality of slices, and the interleaving interface 220 includes a corresponding plurality of interleaving branches. As an example, device 200 is shown with 16 slices in the TI array 230, with the interleaving interface 220 being configured in a corresponding 16-way interleave. However, other array and corresponding interleaving interface sizes may be used depending upon the application. Further details are provided below.

In an example, the AFE 210 includes a tunable termination block 211 to minimize reflections at the interface to the channel. The tunable termination block 211 can have a resistance ranging from 50 to 100Ω. Other resistance ranges may be used depending upon the application.

The next block following the termination block 211 can be an optional block labeled as the continuous time linear equalizer (CTLE) device 212, which can potentially be added or removed using a metal option. This CTLE device 212 provides mid and high frequency boost to the signal to compensate for the signal loss experienced by the transmission passing through the channel. This boosting function can be implemented using a 1-zero, 2-poles equalizer or a more complex equalizer such as 2-zeroes, 3-poles, or others and the like. In a specific example, the amount of boost ranges from about 0 dB to about 6 dB and can be adjusted by settings to change the frequency boost profile, i.e., zero location and amount of peaking. Other boost ranges may be used depending upon the application.

A first variable gain amplifier (VGA) 213, denoted as "VGA1", can be coupled to the CTLE 212 or to termination block 211, and can be configured to provide gain. In an example, the gain can range from about 0 to about 6 dB, but other gain values and ranges may be used depending upon the application. In this case, the CTLE+VGA1 profile can be co-optimized, while in the case where the CTLE 212 is not present, the range requirement with only the VGA1 213 following the termination block 211 may be different.

Following the AFE 210, the input signal is then sampled by the TI array 230 via TI interface 220. As discussed previously, this TI array 230 has N=16 and the interleaving interface 220 is configured as a 16-way interleave that can send the input signal to each of the 16 slices. Each slice of the TI array 230 can be configured with its own clock skew adjustment to optimize for variations in the delays and bandwidth (BW) of each of the samplers.

Each slice of the TI array 230 can also include an FFE 240 (e.g., C-tap sampled FFE), a decision-feedback equalizer (DFE) 250 (e.g., D-tap DFE), and an analog-to-digital converter (marked by region 260), which includes a plurality of decision devices 270 (denoted as "Data & Error Slicers"). As shown in FIG. 2, each slice receives the input signal from the interleaving interface 220 and is configured to perform FFE and DFE process, among other things.

In an example, the FFE 240 may be coupled to a buffer 231 to drive the long interconnect running to/from adjacent slices and a summation circuit 242. The FFE buffer 231, which has some gain adjustment capability (e.g., −2 to 2 dB), can also help mitigate the gain variation between the interleave slices, which is a common issue in time-interleaved designs. This helps reduce the required gain range on subsequent amplifier stages and reduces the tap range requirement due to increased variability on the individual cursors of the N slices. Each slice can also include a probe slicer 232 that receives the input signal from the interleaving interface 220 as well. The FFE 240 can include a switch 241 coupled to an FFE summer 242 (i.e. summation circuit) configured to equalize the effects of the pre-cursors and post-cursors.

The DFE 250 can include a second VGA 251 (denoted as "VGA2") coupled to the FFE summer 241 and a DFE summer 252 configured to equalize the effects of the post-cursors. Following the DFE 250, the array 230 can include an amplifier 260 (e.g., source follower, or the like) is coupled to the decision devices 270 (e.g., data and error slicers). These slicers 270 can also be connected to the other slices in the array 230. Further, these slicers 270 are configured to the timing recovery loop as discussed previously for FIG. 1. Those of ordinary skill in the art will recognize other variations, modifications, and alternatives The interleaving configuration provides the necessary time delay (e.g., Ts=1/56 GHz) for the implementation of the sampled FFE and DFE equalizers. For instance, assume that increasing the slice number means sampling further in time. From the perspective of slice 2 ((x+2)*Ts), the slice 1 ((x+1)*Ts) output would be the $1^{st}$ post-cursor and the slice 3 output would be the $1^{st}$ pre-cursor. Further, the slice 4 output would be the $2^{nd}$ pre-cursor, and so on.

As an example configuration for device 200, the number of taps of the FFE can be C=10, including 3 pre-cursors and 6 post-cursors. The number of taps can be defined during system optimization in conjunction with the CTLE and DFE to equalize medium-reach (MR) and long-reach (LR) channels up to 3-+dB loss at Nyquist frequency. One or more of the post-cursors of the FFE may also be delayed via a switching path (e.g., sample & hold circuit) to allow additional settling time.

According to an example for PAM-4 signal detection, three data slicers (−2, 0, +2) and four (+/−3, +/−1) error slicers are used to slice at the thresholds shown in FIG. 2. Even through one error slicer may be sufficient in some implementations, the four error slicers in this example allow high bandwidth baud-rate timing recovery. This configuration also speeds up the adaptation of the FFE, DFE, gain, and offset loops. In non-return-to-zero (NRZ) mode, only two error slicers are used, and all data slicers are set to the same threshold to slice the center of the eye. In addition, the four error slicers can enable an optional data path for optical enhancement. Another slicer can be used as a calibration slicer, which is used to find the true amplitude of the eye and switches with one data slicer at a time (+2, 0, or −2) in mission mode to enable background calibration of offset. Those of ordinary skill in the art will recognize other variations, modifications, and alternatives for other signal types.

Upon bring-up of the link and in acquisition phase, the TI sampled signals come from a derived clock that feeds into each track and hold. Referring to FIG. 1, the clock device 180 drives the TI interface 140, which has a plurality of interleave lanes (i.e., interleaves), to sample the incoming input signal coming from the AFE 130. Each of the plurality of interleave lanes include a track-and-hold switch, shown in the TI interface 220 of FIG. 2. This process determines the sample time of each interleave path. The task of the FFE is to equalize the signal at that phase and remove inter-symbol interference. As discussed previously, the problem that these systems are faced with is the interaction between the timing recovery loop and the FFE. If the DTL loop moves the phase in a given direction, then without constraints on the FFE coefficients, the FFE will adapt to the new phase, leading the system to move to the edge of the eye and fail.

For this reason, the usual solution is to freeze the adaptation of the first precursor or the first postcursor of the FFE. This will pin the phase and prevent the DTL from wandering. When the temperature of the chip varies, the frequency/phase response of the AFE changes, prompting a change in the sampling phase and equalization of the FFE. But, if the phase of the FFE is pinned because the first precursor or first postcursor are pinned, then the sampling phase becomes suboptimal, leading to worse bit error rates.

Figure 3:
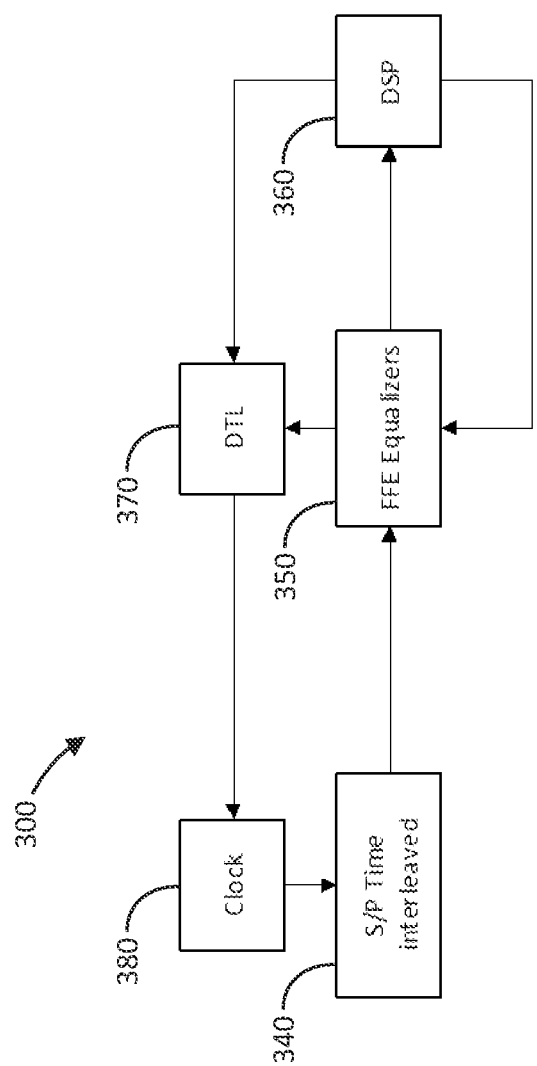
FIG. 3 is a simplified block diagram illustrating a feed-forward equalizer (FFE) configuration in a receiver device according to an example of the present invention.

According to an example, the present invention provides a method and device to decouple the adaptation of the FFE from the DTL loop (i.e., timing recovery loop) using an interleave specific vector configured in the DTL device, thus enabling the phase to be optimized in mission mode. FIG. 3 is a simplified block diagram illustrating a feed-forward equalizer (FFE) configuration in a receiver device according to an example of the present invention. As shown, device 300 includes a TI interface 340, FFE equalizers 350, a DSP 360, a DTL device 370, and a clock device 380. Compared to the receiver device 101 in FIG. 1, the DSP 360 has an additional pathway to the FFE equalizers 350, which has an additional pathway to the DTL device 370.

Referring to FIG. 2, the data and error slicers 270 produce sliced data vectors and error vectors from the input signal processed by the FFE 240 and the DFE 250. The timing recovery loops configured with each array slice use the sliced data vector and error vector to compute the timing information needed to steer the clock recovery. The error vector includes those errors generated from the N-consecutive interleaves of the TI interface 220. Of course, there can be variations, modifications, and alternatives to the slicer configurations.

In an example, the DTL loop (i.e., timing recovery loop) is equipped with an interleave specific enable/disable vector Q[1:N] in the DTL device 370. The ability to turn on or off the contribution of a specific interleave enables the decoupling of the FFE adaptation from the timing recovery, thus avoiding a catastrophic event where the FFE and CDR drive each other in a loop towards losing lock. This vector turns on/off the contribution of the specific time interleave errors to the timing recovery loop. The additional pathway shown in FIG. 3 from DSP 360 through the FFE equalizers 350 to the DTL 370 represents this functionality. Under control of the DSP 360, the FFE equalizers 350 can enable and disable the interleave specific vector in the DTL device 370 during the FFE adaptation process, as further described below.

In a specific example, each of the NFFEs is equipped with Least Mean Squares (LMS) engines for adaptation. Each FFE had C engines to adapt each and every tap. So, there are NxC different taps to adapt. The step of the LMS denoted by "mu" determines the speed of the adaptation. Each FFE engine has a vector MU[1:C] containing C different mu's. A mu value on interleave I and tap J is denoted MU[I][J]. A value of MU[I][J] of zero means that the adaptation is disable on the FFE index I, tap J.

A method of operating a SerDes receiver device using an orthogonalization adaptation algorithm according to an example of the present invention is briefly described as follows:

1. Receiving an input signal;
2. Sampling, by the time-interleaved (TI) interface having a plurality of lanes, the input signal according to a plurality of indexes associated with the plurality of lanes;
3. Determining one or more phase conditions for the plurality of feed-forward equalizers (FFEs), each of the FFEs having a plurality of taps; and
4. Performing, by the plurality of FFEs, an iterative orthogonal adaptation process on the input signal via each of the plurality of lanes of the TI interface as a target lane, wherein the iterative adaptation process includes using the interleave specific vector to decouple the contribution of the target lane from the timing recovery loop while performing an FFE adaptation process on the input signal via the target lane.

The above sequence of steps is used to operate a multi-instance TI system to align the divider phases of a plurality of TI devices (i.e., TI system instances) according to an embodiment of the present invention. Depending upon the embodiment, one or more of these steps can be combined, or removed, or other steps may be added without departing from the scope of the claims herein. One of ordinary skill in the art would recognize other variations, modifications, and alternatives. Further details of these steps are discussed below.

Referring to step (1), the receiver can receive an input signal from a transmitter over a communication channel. The input signal can be received at an analog front-end (AFE), as shown in FIGS. 1 and 2. As discussed above for FIG. 2, the AFE can include a tunable termination block, a continuous time linear equalizer (CTLE), and a variable gain amplifier (VGA).

Referring to step (2), the input signal received at the AFE is sampled by the TI interface, as shown in FIGS. 1 and 2. The TI interface can be referenced according to a plurality of indexes associated with each lane/interleave of the TI interface. As discussed above for FIGS. 1 and 2, each TI interface lane can include track-and-hold switch driven by a clock source. Each lane can be coupled to a slice of a TI array, in which each slice includes one of the FFE equalizers. Further, each slice of the TI array can be configured with its own clock skew adjustment.

Referring to step (3), determining phase conditions for the FFEs can be performed via a finite state machine (FSM) configured in the firmware/DSP. This step can include performing a phase sweep of each FFE using a predetermined sweep condition. The phase sweep of the FFE can use various sweep conditions. In an example, the phase sweep condition can include having the $1^{st}$ precursor fixed, having the $1^{st}$ postcursor fixed, or having both the $1^{st}$ precursor and the $1^{st}$ post cursor fixed, or having the difference between the $1^{st}$ precursor and the $2^{nd}$ precursor fixed. This can be accomplished by disabling the adaptation on that specific tap (or both or the difference) while sweeping its value.

In an example, sweeping the phase of the FFEs is used to determine a desired location/sampling point in a received eye characterizing the input signal. The desired location in the received eye can be determined by an evaluation of signal-to-noise ratio (SNR) and jitter tolerance (e.g., optimal SNR while immune to jitter). Afterwards, the phase of the FFEs can be fixed according to this desired location.

Determining the phase conditions for the FFEs can also include performing an FFE adaptation process on the input signal with a constant phase. This process can include bringing up the data lane (i.e., the receiver channel) using various constant phases. In an example, the constant phase can include a constant $1^{st}$ precursor, a constant $2^{nd}$ precursor, or a constant difference between the $1^{st}$ precursor and the $2^{nd}$ precursor. This tap index can be denoted by "P" (used below in setting the adaptation constant).

Referring to step (4), the orthogonal adaptation method can be triggered if the change in device temperature (T) exceeds a predetermined threshold (e.g., $|T_{current} - T_{previous}| > \Delta$). In an example, current and previous device temperatures are registered values, and, after the temperature change threshold is reached, the previous temperature can be set to the current temperature to prepare for the evaluation of subsequent device temperature changes. Alternatively, the orthogonal adaptation method can be triggered according to other conditions or on a periodic basis.

As briefly summarized above, the iterative orthogonal adaptation process can include an iterative process configured to iterate through each of the interleave indexes (i.e., for indexes=1:N). The iterative orthogonal adaptation process can include (1) disabling the contribution of the target lane/interleave of the TI interface to the timing recovery loop using the interleave specific vector at the associated index, (2) performing an FFE adaptation process without any constraints on all taps of the FFE coupled to the target lane, and (3) enabling the contribution of the target lane/interleave of the TI interface to the timing recovery loop using the interleave specific vector at the associated index.

In the case that an FFE adaptation process is already be in progress, in which case the FFE adaptation on the target interleave will need to be stopped first before using the interleave specific vector. In some cases, the gain of the DTL loop will require changes following the decoupling of the FFE adaptation process from the timing recovery loop. In a specific example, the iterative adaptation process includes fixing the phase of the FFE associated with the target interleave following the FFE adaptation process and before enabling the contribution of the target interleave again. Further, the iterative process can include waiting for predetermined settling time periods between these steps described previously to allow for changes to propagate through the receiver device (e.g., following FFE adaptation start/stop, interleave index disable/enable, DTL gain change, phase fixing, etc.). Those of ordinary skill in the art will recognize other variations, modifications, and alternatives to this iterative adaptation process.

In an example, the interleave specific enable/disable vector (denoted as Q[i]) can be enabled for all index entries of the interleave (e.g., set Q[1:N]=1) to prepare for the iterative adaptation process. In an example, the orthogonal adaptation method can include an iterative process of adapting all taps for each index of the interleave (e.g., index $I_{interleave}$ from 1 to N). For each index, the interleave specific vector is disabled at the target index (e.g., set Q[$I_{interleave}$]=0); this takes the contribution of the interleave at the target index out of the DTL loop. Then, the adaptation of all taps for the target index can be enabled (e.g., enable FFE[$I_{interleave}$]). In a specific example, this action can be accomplished by changing the adaptation constant (mu) for that tap away from zero (e.g., MU[$I_{interleave}$][P]$\sim$=0). The adaptation engine can be enabled for the target index for a predetermined adaptation period of time before the adaptation engine is stopped, which can include changing the adaptation constant (mu) for the tap back to zero (e.g., set MU[$I_{interleave}$][P]=0).

Afterwards, the interleave specific enable/disable vector can once again be enabled for the target index (i.e., set Q[$I_{interleave}$]=1) to put the contribution of interleave at the target index back into the DTL loop. Then, the iterative process can also include waiting for a predetermined settling period of time to allow the DTL loop to settle. Following the iterative process, this method can include enabling the interleave specific enable/disable vector for all index entries of the interleave (e.g., set Q[1:N]=1) to prepare for normal operation. Of course, there can be other variations, modifications, and alternatives to the iterative adaptation process.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A receiver device comprising:
an analog front-end (AFE) device configured to receive an input signal;
a time interleaved (TI) interface coupled to the AFE device, the TI interface having a plurality of lanes, each of the plurality of lanes being associated with an index;
a plurality of feed-forward equalizers (FFEs) coupled to the TI interface, each of the plurality of FFEs being coupled to one of the plurality of lanes;
a digital signal processor (DSP) coupled to the plurality of FFEs;
a delay timing loop (DTL) device coupled to the DSP and the plurality of FFEs; and
a clock device coupled to the DTL device and to the TI interface;
wherein the DTL device includes an interleave specific vector configured to control a contribution of each of the plurality of lanes to the DTL device using the associated indexes; and
wherein plurality of FFEs is configured to perform an iterative adaptation process on the input signal via each of the plurality of lanes as a target lane, wherein the iterative adaptation process includes using the interleave specific vector to disable the contribution of the target lane to the DTL device while performing an FFE adaptation process on the input signal via the target lane.

2. The receiver device of claim 1, wherein the AFE includes a tunable termination block coupled to a variable gain amplifier (VGA).

3. The receiver device of claim 2, wherein the AFE includes a continuous time linear equalizer (CTLE) configured between the tunable termination block and the VGA.

4. The receiver device of claim 1, further comprising a plurality of decision-feedback equalizers (DFEs) coupled to the plurality of FFEs, and a plurality of data and error slicers coupled to the plurality of DFEs and the DSP.

5. The receiver device of claim 1, wherein the plurality of FFEs are configured within a TI array coupled between the TI interface and the DSP, the TI array having a plurality of TI array slices, and each of the TI array slices including one of the plurality of FFEs.

6. The receiver device of claim 5, wherein each of the TI array slices includes a decision-feedback equalizer (DFE) coupled to the FFE and a plurality of data and error slicers coupled to the DFE.

7. A method of operating a receiver device, the method comprising:
receiving an input signal;
sampling, by a time-interleaved (TI) interface having a plurality of lanes, the input signal according to a plurality of indexes associated with the plurality of lanes;
determining one or more phase conditions for a plurality of feed-forward equalizers (FFEs) coupled to the TI interface in a timing recovery loop configuration; and
performing, by the plurality of FFEs, an iterative adaptation process on the input signal via each of the plurality of lanes as a target lane, wherein the iterative adaptation process includes using an interleave specific vector to disable a contribution of the target lane to the timing recovery loop configuration while performing an FFE adaptation process on the input signal via the target lane, and wherein the interleave specific vector is configured within the timing recovery loop configuration.

8. The method of claim 7, wherein receiving the input signal comprises
processing, by a tunable termination block of an analog front-end (AFE) device, the input signal to minimize reflections; and
processing, by a variable gain amplifier (VGA) of the AFE device, the input signal to provide gain.

9. The method of claim 8, wherein receiving, by the AFE device, the input signal further comprises processing, by a continuous time linear equalizer (CTLE) of the AFE device coupled between the tunable termination block and the VGA, the input signal to provide frequency boost.

10. The method of claim 7, wherein determining one or more phase conditions comprises sweeping the phase of the plurality of FFEs using a predetermined sweep condition.

11. The method of claim 10, wherein the predetermined sweep condition includes fixing a first precursor or a first postcursor.

12. The method of claim 7, wherein determining one or more phase conditions comprises performing an FFE adaptation process on the input signal with a constant phase.

13. The method of claim 12, wherein the constant phase includes a constant first precursor or a constant second precursor.

14. The method of claim 7, wherein performing the iterative adaptation process is triggered upon a temperature threshold condition or on a periodic basis.

15. The method of claim 7, wherein each of the plurality of FFEs includes a plurality of taps and is coupled to one of the plurality of lanes of the TI interface; and
wherein performing the FFE adaptation process comprises performing the FFE adaptation process on each of the plurality of taps of the FFE coupled to the target lane of the TI interface while using the interleave specific vector to disable the contribution of the target lane to the timing recovery loop configuration.

16. A communication system comprising:
a transmitter;
a channel coupled to the transmitter; and
a receiver coupled to the channel, the receiver comprising
an analog front-end (AFE) device configured to receive an input signal;

a time interleaved (TI) interface coupled to the AFE device, the TI interface having a plurality of lanes, each of the plurality of lanes being associated with an index;

a plurality of feed-forward equalizers (FFEs) coupled to the TI interface, each of the plurality of FFEs being coupled to one of the plurality of lanes;

a digital signal processor (DSP) coupled to the plurality of FFEs;

a delay timing loop (DTL) device coupled to the DSP and the plurality of FFEs; and a clock device coupled to the DTL device and to the TI interface;

wherein the DTL device includes an interleave specific vector configured to control a contribution of each of the plurality of lanes to the DTL device using the associated indexes; and wherein plurality of FFEs is configured to perform an iterative adaptation process on the input signal via each of the plurality of lanes as a target lane, wherein the iterative adaptation process includes using the interleave specific vector to disable the contribution of the target lane to the DTL device while performing an FFE adaptation process on the input signal via the target lane.

17. The communication system of claim 16, wherein the AFE includes a tunable termination block, a continuous time linear equalizer (CTLE) coupled to the tunable termination block, and a variable gain amplifier (VGA) coupled to the CTLE.

18. The communication system of claim 16, further comprising a plurality of decision-feedback equalizers (DFEs) coupled to the plurality of FFEs, and a plurality of data and error slicers coupled to the plurality of DFEs and the DSP.

19. The communication system of claim 16, wherein the plurality of FFEs are configured within a TI array coupled between the TI interface and the DSP, the TI array having a plurality of TI array slices, and each of the TI array slices including one of the plurality of FFEs.

20. The communication system of claim 19, wherein each of the TI array slices includes a decision-feedback equalizer (DFE) coupled to the FFE and a plurality of data and error slicers coupled to the DFE.

\* \* \* \* \*